United States Patent [19]

Fuminao

[11] Patent Number: 4,711,278
[45] Date of Patent: Dec. 8, 1987

[54] TREE PRUNING MACHINE

[75] Inventor: Tanitomi Fuminao, Houtaku, Japan

[73] Assignee: Kaisei Kogyo Corporation, Japan

[21] Appl. No.: 905,989

[22] Filed: Sep. 10, 1986

[51] Int. Cl.⁴ .......................... A01G 23/02; B27L 1/00
[52] U.S. Cl. .................................... 144/2 Z; 144/343
[58] Field of Search ............................... 144/2.Z, 343

[56] References Cited

U.S. PATENT DOCUMENTS

| | | | |
|---|---|---|---|
| 3,030,986 | 4/1962 | Longert | 144/2 Z |
| 3,356,113 | 12/1967 | Perugia | 144/2 Z |
| 3,385,332 | 5/1968 | Otterbach, et al. | 144/2 Z |
| 3,451,448 | 6/1969 | Michener | 144/2 Z |
| 3,454,058 | 7/1969 | Fend | 144/2 Z |
| 3,457,973 | 7/1969 | Meier | 144/2 Z |
| 3,545,509 | 12/1970 | Baxter, Jr. | 144/2 Z |
| 4,527,603 | 7/1985 | Hori | 144/2 Z |
| 4,624,293 | 11/1986 | Suezaki | 144/2 Z |

Primary Examiner—W. D. Bray
Attorney, Agent, or Firm—Townsend and Townsend

[57] ABSTRACT

A tree pruning machine which has a body for vertically elevating on a standing tree through a wheel driven by an engine, a rotary device for turning on the periphery of the body, a cutting unit provided in the rotary device and having a detector for detecting the cutting resistance effected from the cutting branch, and a rotating speed reduction unit of the rotary device, wherein the rotating speed reduction unit is controlled by the detector of the cutting resistance. If a branch having a large current resistance such as a thick or hard branch makes contact with the cutting unit, the detector detects the contact of the cutting unit with the branch having large cutting resistance, the contact is detected by the detector to decelerate the rotating speed. Thus, the pruning machine can cut branches of a standing tree having large cutting resistance such as thick or hard branches.

6 Claims, 6 Drawing Figures

FIG.1-(A)
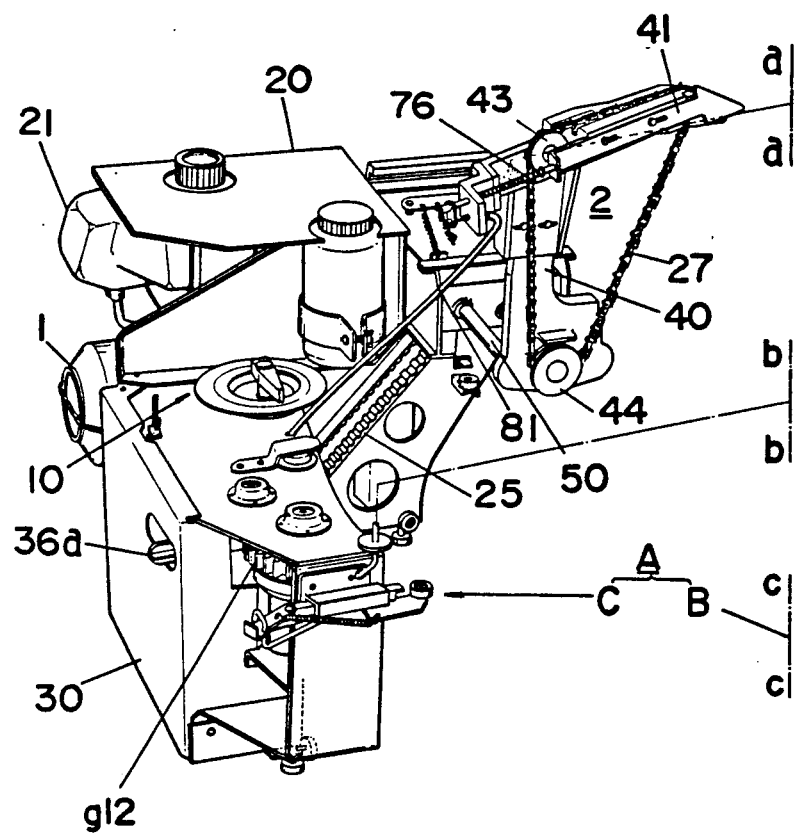

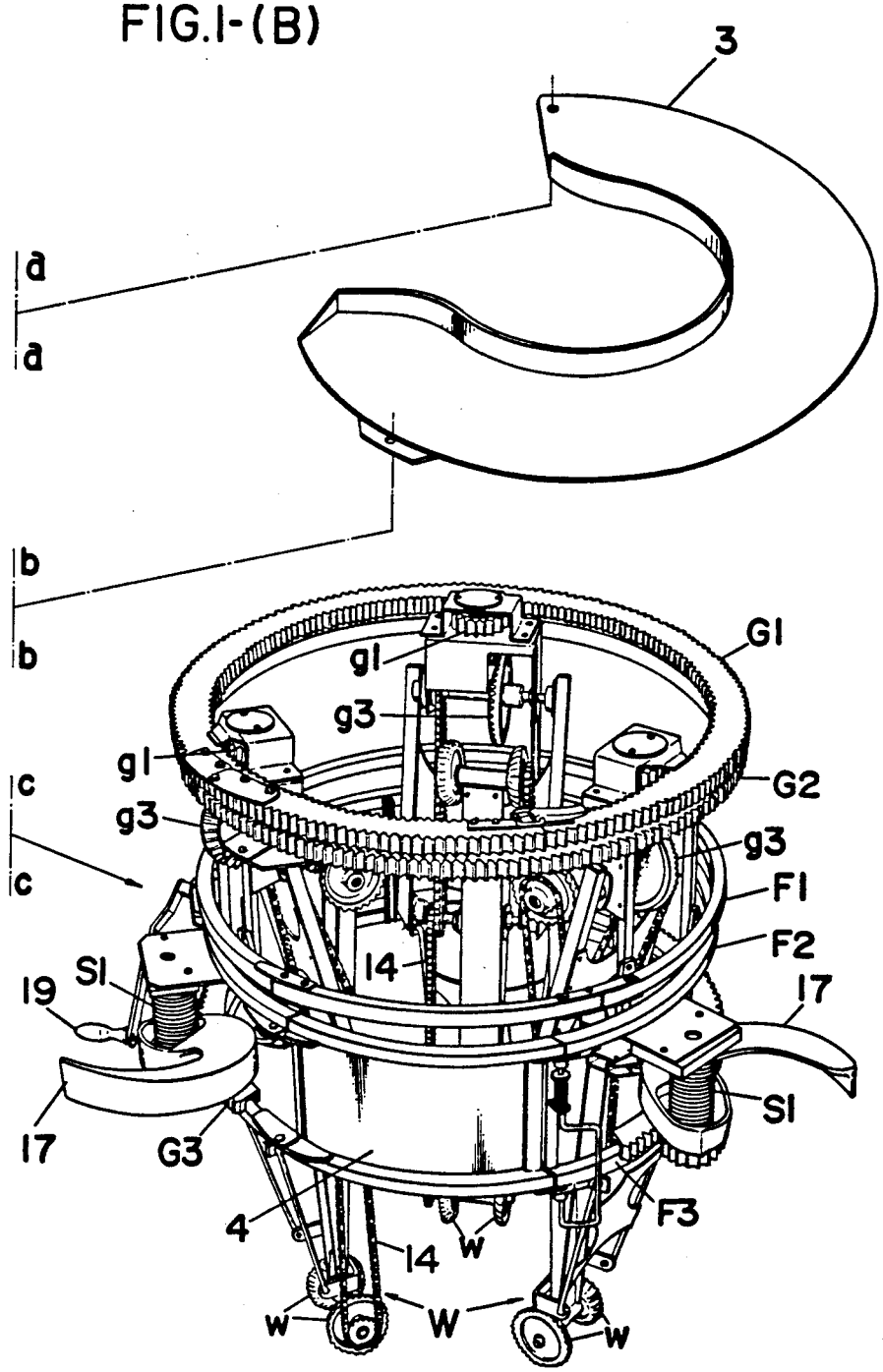
FIG.1-(B)

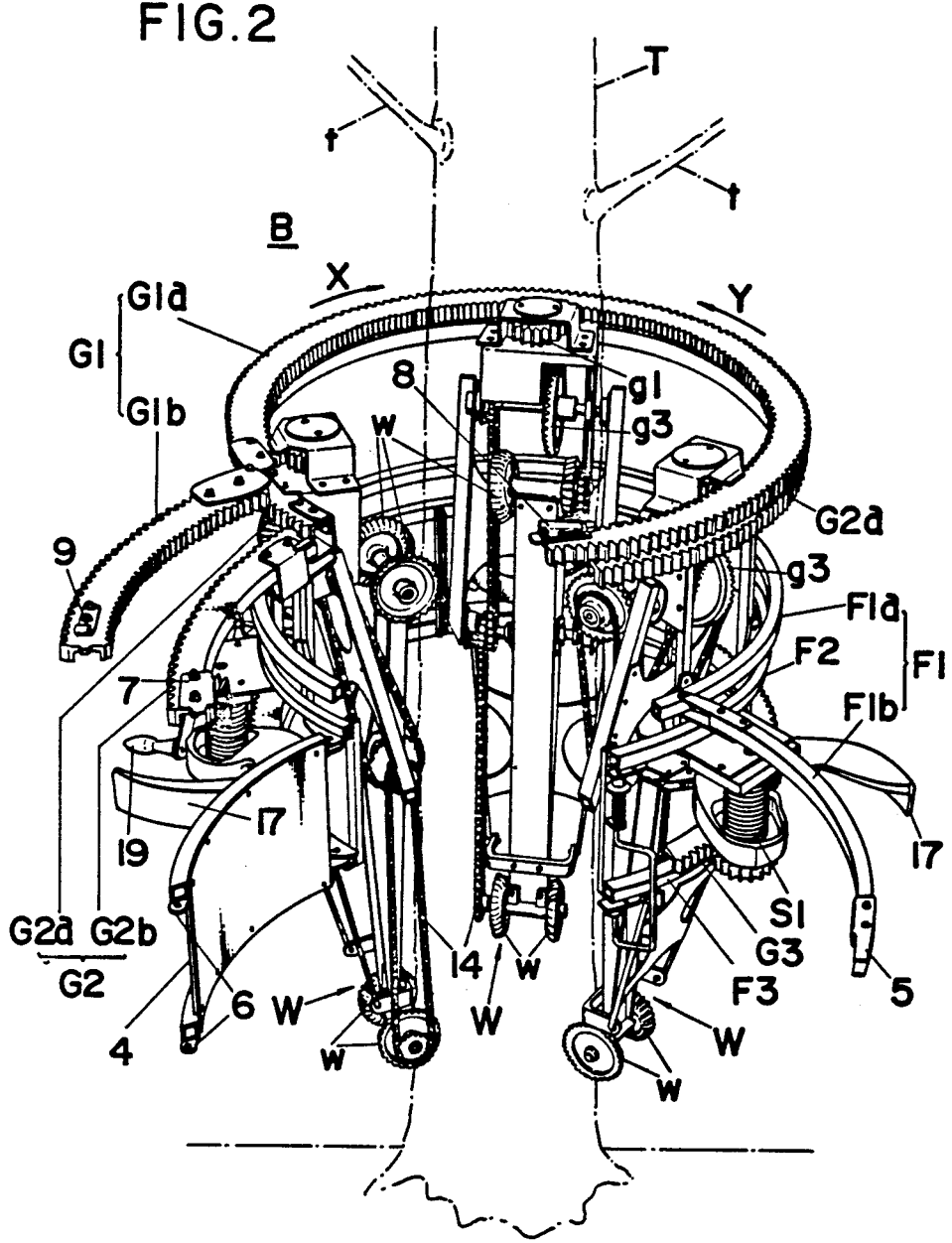

TREE PRUNING MACHINE

BACKGROUND OF THE INVENTION

1. Field of the Invention

This invention relates to a tree pruning machine and, more particularly, to a tree pruning machine adapted to have a body for vertically elevating on a standing tree through wheels, and a cutting unit for cutting branches of the tree while turning on the periphery of the body.

2. Description of the Prior Art

A tree pruning machine for cutting branches of a standing tree by a cutting unit while elevationally climbing on the tree through wheels driven by an engine is known. However, since the cutting force of the cutting unit of the conventional tree pruning machine of this type is relatively small, it is difficult to cut branches having large cutting resistance such as thick or hard branches. An engine of large horsepower is considered as means for increasing the cutting force of the cutting unit so as to cut the thick or hard branches. If the engine of large horsepower is employed, the weight of the engine itself increases and it is further necessary to rigidly form a frame of the pruning machine, thereby increasing the own weight of the machine and hence wasting the output of the engine for the elevating force on the standing tree, resulting in no expectation to strengthen the cutting force of the cutting unit in the pruning machine.

SUMMARY OF THE INVENTION

An object of this invention is to provide a tree pruning machine which can eliminate the drawbacks and the disadvantages of the conventional tree pruning machine and is capable of cutting branches of a standing tree having large cutting resistance such as thick or hard branches.

Another object of this invention is to provide a tree pruning machine which can cut branches of a standing tree having large cutting resistance without raising the horsepower of an engine.

In order to achieve the above and other objects, there is provided a tree pruning machine comprising a body for vertically elevating on a standing tree through a wheel driven by an engine, a rotary device for turning on the periphery of the body, a cutting unit provided in the rotary device and having a detector for detecting the cutting resistance effected from the cutting branch, and a rotating speed reduction unit of the rotary device, wherein the rotating speed reduction unit is controlled by the detector of the cutting resistance. More particularly, if a branch having a large current resistance such as a thick or hard branch makes contact with the cutting unit, the detector detects the contact of the cutting unit with the branch having large cutting resistance, the contact is detected by the detector to decelerate the rotating speed of the rotary device, thereby slowly and effectively cut the branch.

BRIEF DESCRIPTION OF THE DRAWINGS

FIGS. 1(A) and 1(B) are perspective views of an embodiment of a tree pruning machine according to this invention;

FIG. 2 is a perspective view of a body of the machine;

DESCRIPTION OF THE PREFERRED EMBODIMENTS

Figure 3:
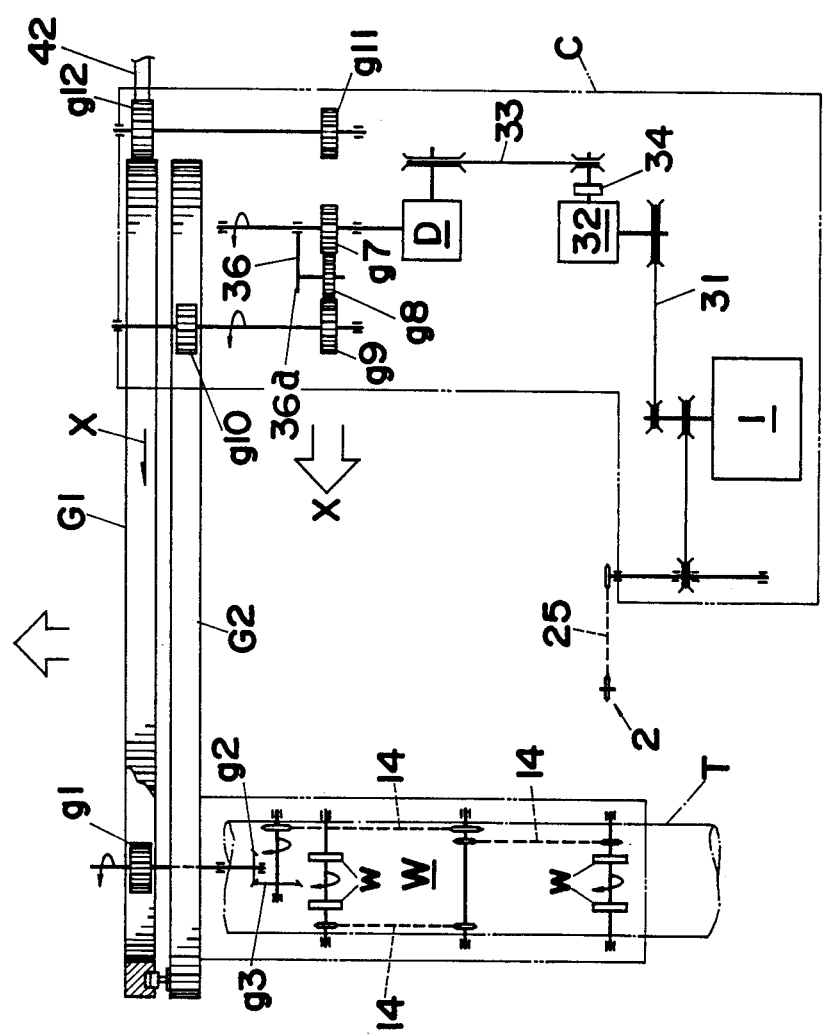
FIG. 3 is a developed view of a transmission of the machine when the tree pruning machine upwardly elevates on a standing tree.

An embodiment of this invention will be described in detail with reference to the accompanying drawings.

FIG. 1 is a perspective view of an embodiment of a tree pruning machine constructed according to this invention. A tree pruning machine A comprises a body B mounted on a standing tree, and a rotary device C detachably attached to the body B. The body B has a plurality of elevating wheels w. When the wheels w are rotated by an engine 1 carried in the rotary device C, the body B vertically elevates upwardly along the standing tree, or climbs on the standing tree. The rotary device C cuts the branch of the tree from the root by a saw chain 27 of a cutting unit 2 while turning on the periphery of the body B when the body B climbs on the standing tree. Reference numeral 3 designates a cover plate.

FIG. 2 is a perspective view of the body B in the state that the body B is mounted on a standing tree T or dismounted from the tree T. The body B has circular frames F1, F2 and F3 as main frames, and various components to be described later are mounted on the respective frames F1 to F3. G1 is a movable large ring gear disposed at the uppermost unit of the body B and formed with teeth on the outer and inner peripheral surfaces thereof. When the tree pruning machine A climbs on the standing tree T, the ring gear G1 is driven by the engine 1 to turn around the standing tree T as a center in a direction as designated by an arrow X in FIG. 2, thereby transmitting a normal rotation to the respective wheels w. When the tree pruning machine A elevates down along the standing tree T, the ring gear G1 is driven to turn in an opposite direction as designated by an arrow Y in FIG. 2, thereby rotating the respective wheels w reversely. G2 is a stationary large ring gear disposed directly under the movable large ring gear G1 and formed with teeth on the outer peripheral surface thereof. The ring gear G2 is not rotated in X-Y direction as the ring gear G1, but fixed. When the body B climbs on the standing tree T, the rotary device C cuts the branch t by the cutting unit 2 while turning in a direction of the arrow X along the ring gear G2. In other words, the ring gear G2 acts as a guide rail for turning the rotary device C around the standing tree T. G3 is a large arcuate interlocking ring gear surrounding the standing tree T and disposed directly above the frame F3. The ring gear G3 is driven by the engine to move by interlocking three elevating wheel units W mounted with the wheels w simultaneously in the same distance toward the center of the standing tree T or radially outwardly of the standing tree T to always hold the standing tree T at the center of the body B. The frame F1 has a main frame F1a and a sub frame F1b. When the body B is mounted on the standing tree T or dismounted from the tree T, the sub frame F1b is opened as shown in FIG. 2. An openable plate 4 is attached to the frames F2 and F3. When the body B is mounted on the standing tree T or dismounted from the tree T, the openable plate 4 is opened as shown in FIG. 2.

The ring gears G1 and G2 also respectively have main gears G1a, G2a and sub gears G1b, G2b. When the body B is attached to the standing tree T or removed from the tree T, the sub frame F1b, the openable plate 4 and the sub gears G1b, G2b are all opened as shown in FIG. 2 to provide an opening capable of passing the standing tree T. Thus, after the standing tree T is inserted from the opening to dispose the tree T at the center of the body B, the sub frame F1b, the openable plate 4 and the sub gears G1b, G2b are closed as shown in FIG. 1. Reference numerals 5, 6, 7, 8 and 9 designate stoppers. In FIG. 1, numeral 10 depicts a climbing height setter for setting the climbing height of the tree pruning machine A, numeral 20 indicates a cover plate, numeral 21 illustrates gasoline tank, numeral 25 designates a timing belt for transmitting the rotation of the engine 1 to the saw chain 27 of the cutting unit 2, and numeral 30 depicts a box for containing gears to be described later.

g1 designates a small gear engaged in mesh with the inside of the ring gear G1, g3 is a bevel gear, and numeral 14 indicate a chain. The rotation of the engine 1 is transmitted through the gears g1, g3 and the chain 14 to the respective wheels w. Numeral 17 is a cam for contacting under pressure the wheel units W toward the central direction of the standing tree T, S1 is a coil spring mounted on the rotational shaft of the cam 17, and numeral 19 is a handle for forcibly opening the cams 17.

Figure 4:
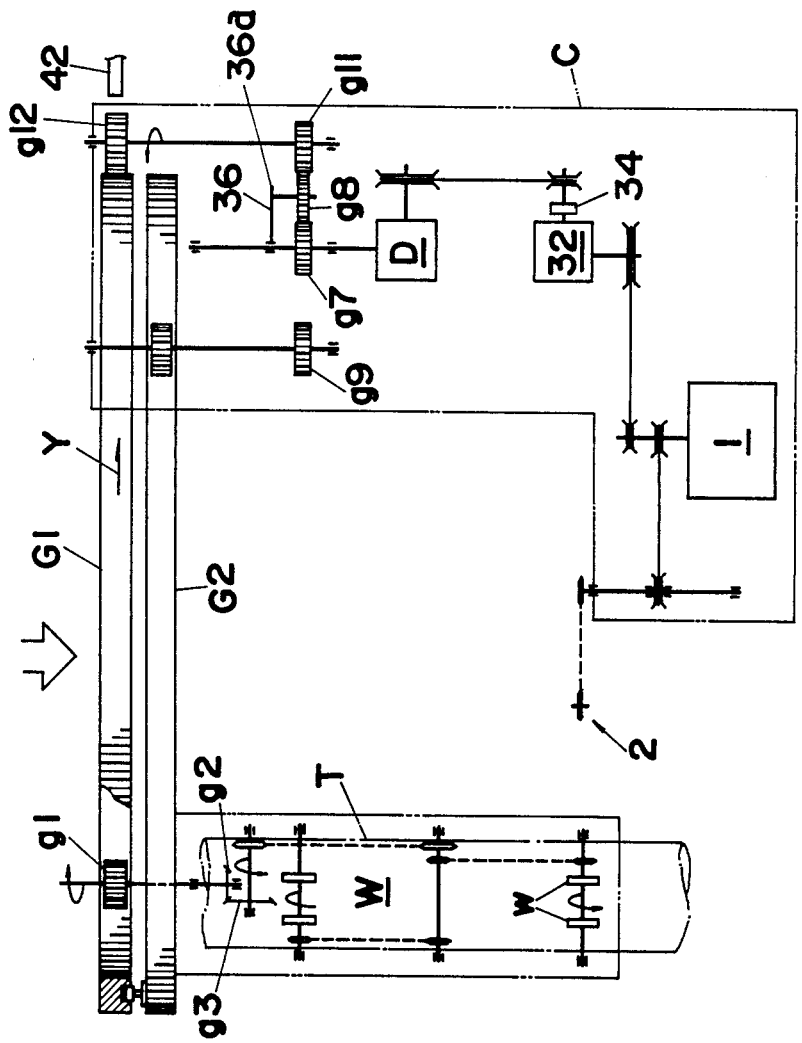
FIG. 4 is a developed view of a transmission of the machine when the tree pruning machine downwardly elevates on the standing tree.

FIGS. 3 and 4 are developed views of the transmission of the tree pruning machine. The transmission of the machine will be described with reference to FIGS. 3 and 4.

g2 is a gear disposed between the gears g1 and g3, and the rotation of the engine 1 is transmitted through the gears g1 to g3 and the chain 14 to the respective wheels w. Numerals 31 and 33 denote transmission belts driven by the engine 1, numeral 32 is a reduction gear, numeral 34 is a frictional clutch, and D is a rotating speed reduction unit of the rotary device C.

g7 is a gear coupled with a reduction gear unit D, and g9 and g11 are gears disposed at both sides of the gear g7. A gear g10 engaged in mesh with the ring gear G2 is coupled with the gear g9. g8 is a movable gear for supporting to a rotary lever 36. When the tree pruning machine A climbs on the standing tree T, it is engaged in mesh with the gears g7 and g8 as shown in FIG. 3. In this state, the rotation of the engine 1 transmitted to the gear g7 is transmitted through the gears g8 and g9 to the gear g10, which rolls along the ring gear G2. Thus, the rotary device C rotates in a direction as designated by the arrow X around the body B to cut the branch t by the cutting unit 2. In this case, a stopper 42 is engaged with the gear g12 to prevent it from rotating. Therefore, when the rotary device C rotates in a direction of an arrow X, the ring gear G1 is towed by the gear g12 to rotate in the same direction as the arrow X. This rotation is transmitted through the gears g1 to g3 and the chain 14 to the respective wheels w. The wheels w thus rotates normally to allow the tree pruning machine A to climb on the standing tree T.

When the tree pruning machine A elevates down on the standing tree T, the gear g8 is engaged in mesh with the gears g7 and g11 as shown in FIG. 4. The rotation of the engine 1 is not transmitted to the gear g9 in this state, the stopper 42 is separated from the gear 12 in a free state, and the tree pruning machine A moves down on the standing tree T by its own weight. In this case, the ring gear G1 is turned in the direction of an arrow Y reversely of the wheels 2. Numeral 36a designates a lever for manually operating the rotary lever 36. The lever 36a is exposed from the box 30 as shown in FIG. 1. When the body B is mounted on the standing tree T to climb on the tree T, the lever 36a is operated to engage the gear g8 in mesh with the gear g9 as shown in FIG. 3.

Figure 5:
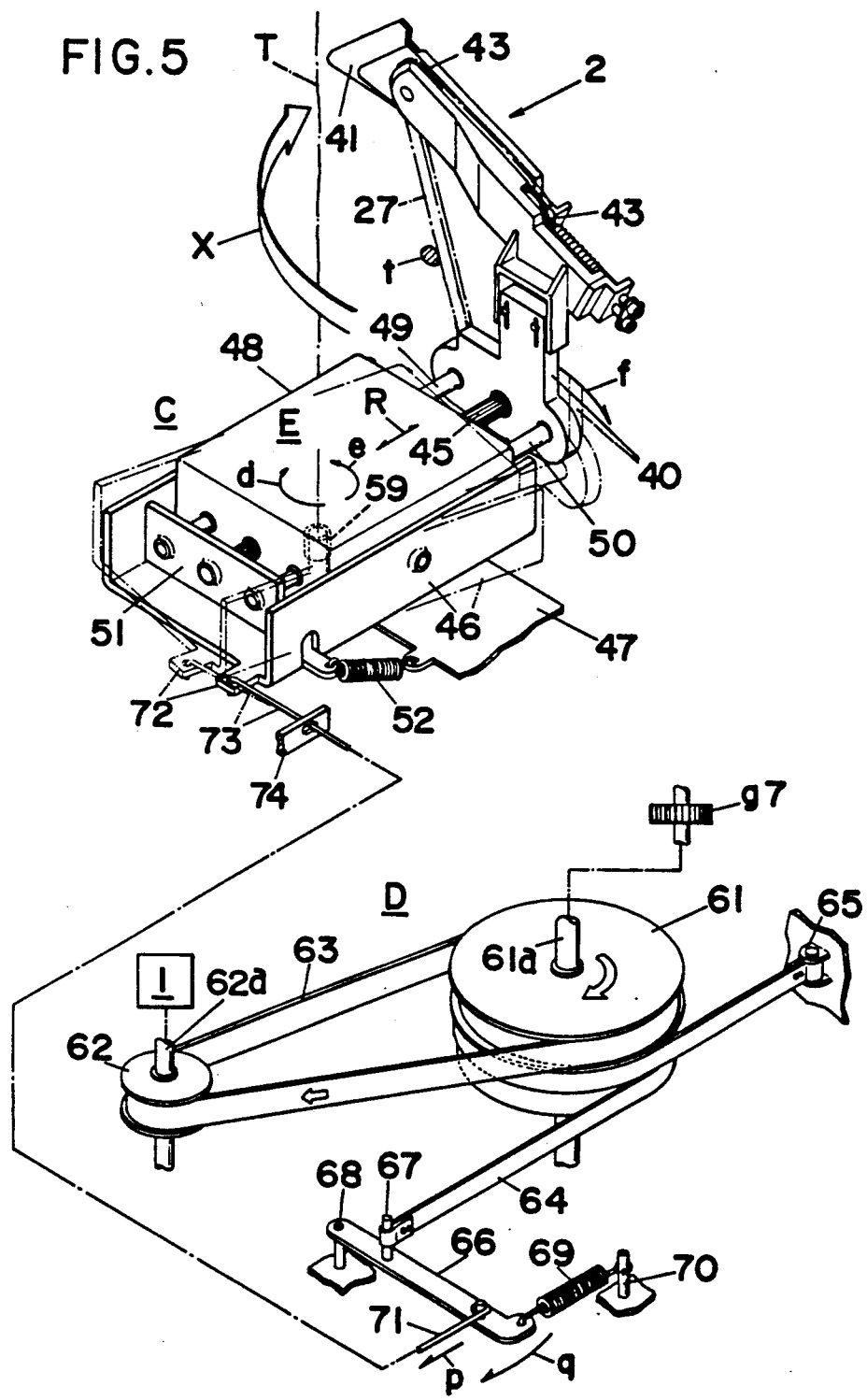
FIG. 5 is a perspective view of a cutting unit and a rotating speed reduction unit of the machine.

Then, by referring FIG. 5, the cutting unit 2 and the rotating speed reduction unit D will be described. The cutting unit 2 is formed of a frame 40 of substantially inverted L shape as a main body. Numerals 43, 43 designate rollers journaled to the top of the frame 40, and numeral 44 is a sprocket in FIG. 1. The saw chain 27 is engaged with the rollers 43, 43 and the sprocket 44. The sprocket 44 is driven through the belt 25 and a spline shaft 45 by the engine 1. Numeral 45 denotes a supporting frame disposed horizontally rotatably as an arrows e, d at a pin 59 of a fulcrum as a center on the frame 47, and a box 48 is mounted on the frame 46. Numerals 52 is a spring for elastically supporting the frame 46. When the cutting unit 2 is pressed backward in the direction designated by an arrow f due to the fact that a thick or hard branch having a large cutting resistance is contacted with the saw chain 27, the frame 46 is rotated at a pin 59 as a center in the direction of an arrow d against the tension of the spring 52 as shown by a dotted chain line in FIG. 5. In other words, the frame 46 and the spring 52 supported to the pin 59 form a detector E for the cutting resistance effected by the branch during cutting by the cutting unit 2. When the cutting unit 2 is pressed backward by the branch t having large cutting resistance in the direction as designated by an arrow f, the frame 46 is rotated in the direction of an arrow d, and the cutting unit 2 detects the cutting resistance effected from the branch t during cutting by the cutting unit 2. The spline shaft 45 and the levers 49, 50 of the frame 40 parallel to the shaft 45 are mounted telescopically in the radial direction R of the standing tree T in the box 48, the cutting unit 2 is pressed toward the central direction of the standing tree by the tension of a spring, not shown, to be elastically contacted with the surface of the standing tree. Numeral 51 designates a mounting plate of the rear ends of the shaft 45 and the levers 49, 50.

It is difficult to cut the branch t at the top of the cutting unit 2. Therefore, the tree pruning machine A comprises a branch sensing member 41 for avoiding the branch t contacted with the top of the cutting unit 2. The sensing member 41 is elastically supported by a spring 76 as shown in FIG. 1 to be attached telescopically with the top of the frame 40. When the sensing member 41 makes contact with the branch t so that the sensing member 41 is moved backward, the stopper 42 is towed by a wire, not shown, contained in a pipe 81 to be separated from the gear g12 as shown in FIG. 4. The tree pruning machine A elevates down on the standing tree T by its own weight to avoid the branch t contacted with the top of the cutting unit 2. When the tree pruning machine A thus elevates down on the tree T so that the cutting unit 2 avoids the branch t, the sensing member 41 is projected immediately forwardly by the tension of the spring 76, the stopper 42 is again engaged in mesh with the gear g12 as shown in FIG. 3. Thus, the tree pruning machine A again climbs on the standing tree to cut the branch avoided previously as described above by the central portion of the cutting unit 2.

The rotating speed reduction unit D of the rotary device C is composed of a brake unit which has a driven wheel 61, a drive wheel 62, a belt 63, and a brake band 64 engaged with the lower portion of the driven wheel 61. Numerals 61a, 62a designate rotational shafts of the wheels 61 and 62. Numeral 65 is a stopper of the rear end of a brake band 64. The end of the brake band 64 is fixed to a pin 67 stood on a rotary plate 66. Numeral 68 is a rotational shaft at the rear of the rotary plate 66. The end of the rotary plate 66 is elastically supported by a spring 69. Numeral 70 denotes a stopper of the spring 69. Numeral 71 is a lever engaged with the end of the rotary plate 66, and the lever 71 is coupled with a lever 73 engaged with a stopper 72 projected form the frame 46. Numeral 74 designates a support of the lever 73.

When the tree pruning machine A climbs on the standing tree, the drive wheel 62 is driven by the engine 1 to transmit the rotation of the engine to the driven wheel 61. The gear g7 is rotated by the rotation of the driven wheel 61. Thus, the rotary device C is rotated in the direction of an arrow X around the body B as described above, and the branch t is cut by the saw chain 27. If the branch t having a large cutting resistance such as a thick or hard branch is contacted with the saw chain 27, the cutting unit 2 is pressed by the branch to move backward in the direction of an arrow f. Thus, the frame 46 and the box 48 are rotated in the direction of an arrow D at the pin 59 as a center as designated by dotted chain line in FIG. 5. Then, the lever 71 is towed in the direction of an arrow P for pulling the end of band 64 affixed to pin 67. The brake band 64 is clamped to the driven wheel 61, and the rotating speed of the driven wheel 61 is decelerated. Then, the rotating speed of the gears g7 g10 are decelerated, the rotating speed of the rotary device C in the direction of the arrow X is also decelerated, and the cutting unit 2 slowly cuts the branch t. When the branch t is cut, the frame 46 and the box 48 are rotated by the tension of the spring 52 in the direction of the arrow e to be returned to the original position (designated by a solid line in FIG. 5), the brake band 64 is loosened, the driven wheel 61 is returned to the constant normal speed, the rotary device C is again rotated around the body B at the predetermined speed. According to the tree pruning machine of this invention, when the branch t having a large cutting resistance is contacted with the saw chain 27, it is detected by the detector E as the rotation of the direction of an arrow d of the frame 46 to operate the reduction unit D. Thus, the rotating speed of the rotary device C is decelerated, thereby effectively cutting the branch t having large cutting resistance.

This invention is not limited to the particular embodiments described above. For example, in the embodiment described above, the rotating speed recution unit has been described with the example of a brake device using the brake band. However, a frictional clutch unit may be used instead of such a brake device, and when the cutting unit is pressed by the branch to displace backwardly, the frictional clutch unit is operated by interlockingly, and the cutting unit may be decelerated in the rotating speed toward the branch cutting direction. Various other changes and modifications may be made within the spirit and scope of this invention.

According to this invention as described above, when the branch having a large cutting resistance such as a thick or hard branch is contacted with the cutting unit 2, the contact is detected by the detector E to operate the rotating speed reduction unit d, thereby decelerating the rotating speed of the rotary device C to slowly and effectively cut the branch.

What is claimed is:

1. A tree pruning machine comprising:
   a generally annular body;
   means for elevating the body vertically on the tree;
   a cutting unit mounted on the body;
   means for rotating the cutting unit around a periphery of the body;
   means, connected to the cutting unit, for detecting resistance to the cutting unit by a branch; and
   means, controlled by the resistance detecting means, for reducing the speed of rotation of the cutting unit around the periphery of the body when a prescribed branch cutting resistance is detected.

2. The tree pruning machine according to claim 1 wherein the resistance detecting means comprises:
   a first frame mounted on the cutting unit;
   a second frame is close proximity to and pivotally connected to the first frame, the second frame being oriented for pivoting in response to the prescribed branch cutting resistance; and
   means for biasing the second frame in the direction of rotation of the cutting unit.

3. The tree pruning machine according to claim 2 wherein the cutting unit is oriented generally vertically and the second frame pivots in a generally horizontal plane in response to the prescribed branch cutting resistance.

4. The tree pruning machine according to claim 3 wherein the reducing means comprises:
   a wheel driven by the rotating means;
   a band in bearing contact with the wheel; and
   means, connected to the resistance detecting means for increasing contact friction between the band and the wheel an decreasing the rotational speed of the cutting unit around the periphery of the body when the prescribed branch cutting resistance is detected.

5. The tree pruning machine according to claim 4 wherein the band encircles the wheel and has first and second ends, the first end being securely affixed to the cutting unit.

6. The tree pruning machine according to claim 5 further comprising means, connected to the second frame and to the second end of the band, for pulling on the second end of the band and increasing the contact friction between the band and the wheel when the second frame pivots in response to the prescribed branch cutting resistance.

* * * * *